United States Patent [19]

Barnett, Jr.

[11] 4,184,271
[45] Jan. 22, 1980

[54] MOLECULAR MODEL

[76] Inventor: James W. Barnett, Jr., 4428 Avenue R, Galveston, Tex. 77550

[21] Appl. No.: 905,003

[22] Filed: May 11, 1978

[51] Int. Cl.² ............................................ G09B 23/26
[52] U.S. Cl. ...................................... 35/18 A; 46/28
[58] Field of Search ...................... 35/18 A, 20; 46/28

[56] References Cited

U.S. PATENT DOCUMENTS

| | | | |
|---|---|---|---|
| 1,851,159 | 3/1932 | Dodge | 35/18 A |
| 3,107,439 | 10/1963 | Parr | 35/18 A |
| 3,296,714 | 1/1967 | Klotz | 35/20 |
| 3,594,924 | 7/1971 | Baker | 35/18 A |
| 3,802,097 | 4/1974 | Gluck | 35/18 A |
| 3,903,616 | 9/1975 | Gage | 35/18 A |

FOREIGN PATENT DOCUMENTS

| | | | |
|---|---|---|---|
| 1195407 | 5/1959 | France | 46/28 |
| 1277731 | 6/1972 | United Kingdom | 35/18 A |

*Primary Examiner*—Harland S. Skogquist
*Attorney, Agent, or Firm*—Neal J. Mosely

[57] ABSTRACT

A model for representing nucleic acid molecules, such as deoxyribonucleic acid (DNA) and ribonucleic acid (RNA) consists of a plurality of helical segments secured together in end to end relation in the form of one or two helixes comprising the molecular backbone. Each of the helical segments is proportioned in length and helical curvature to be a model of the backbone units of the DNA and RNA molecules. Each unit has a flat planar member extending from the mid portion thereof which has a shape corresponding to one of the bases found in each of the separate nucleotides. Means are provided for securing the bases on opposing nucleotides together to hold a pair of helical molecular backbones together, with the helical segments and planar members illustrating the size, proportions, and relationship in the molecule in the various nucleotides.

6 Claims, 7 Drawing Figures

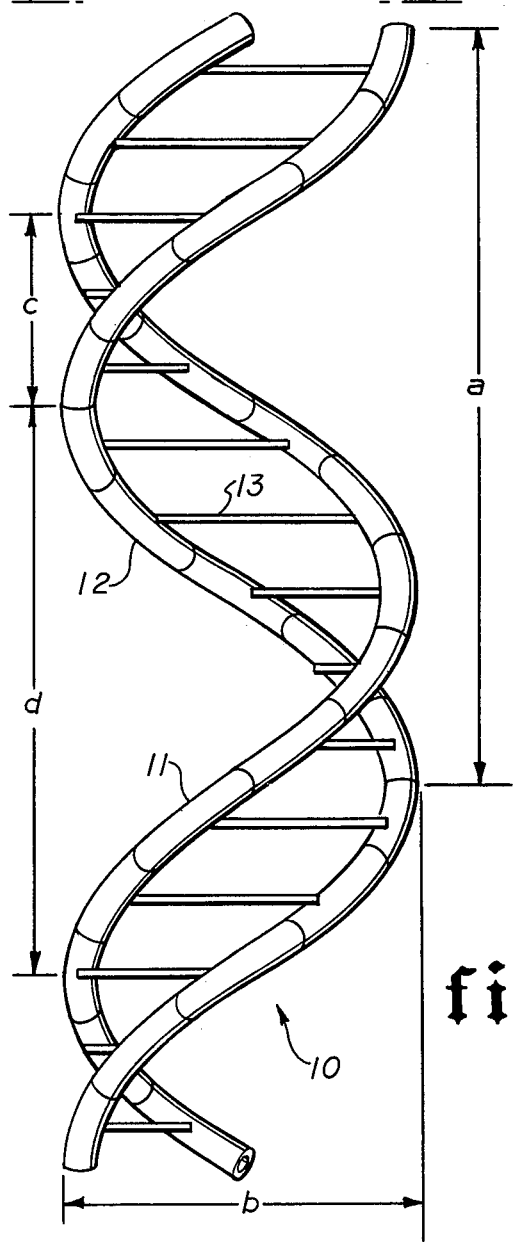
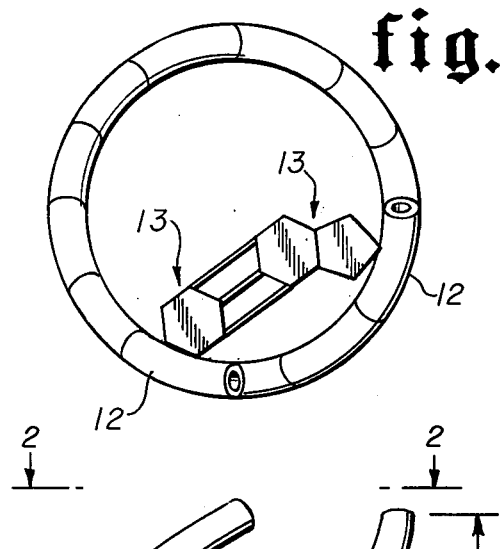
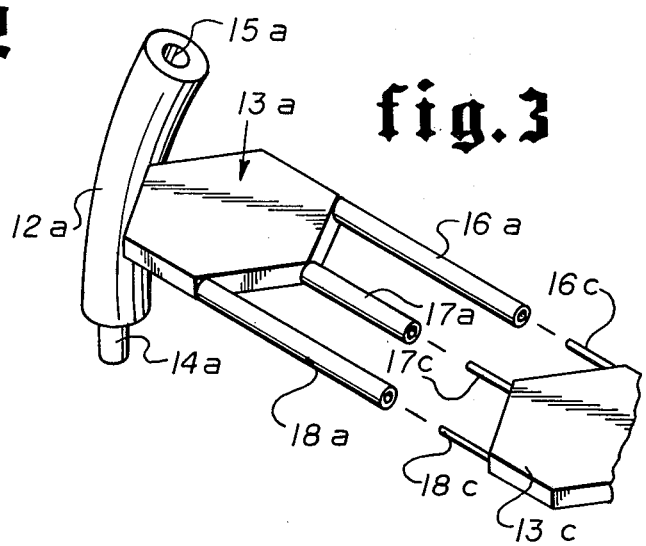
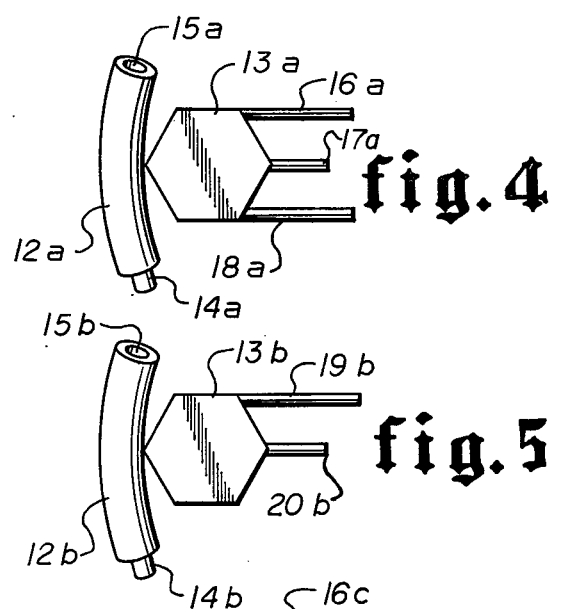
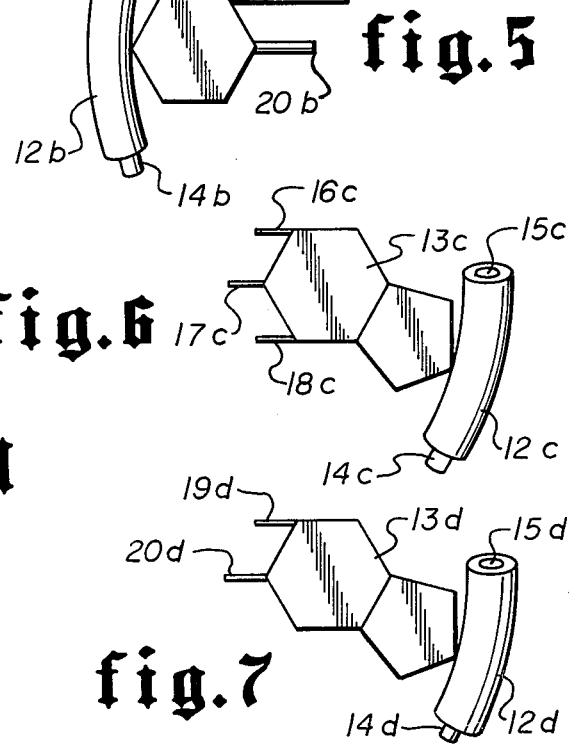
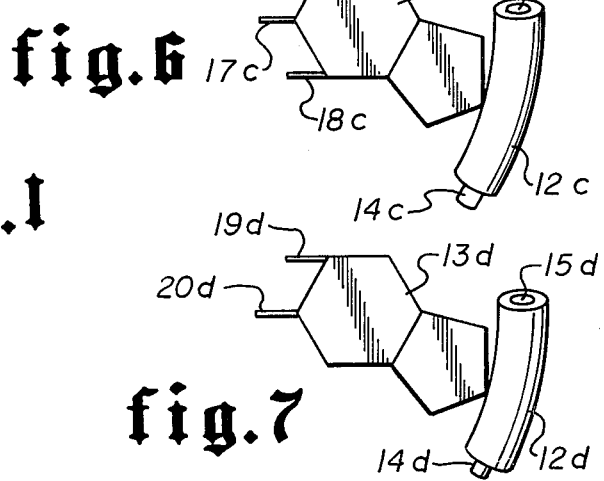
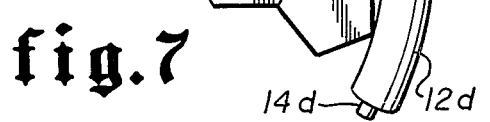

MOLECULAR MODEL

BACKGROUND OF THE INVENTION

1. Field of the Invention

This invention relates to molecular models for simulating the structure of the nucleic acids, DNA and RNA.

One of the great scientific advances of the mid-twentieth century has been the discovery of the structure of the nucleic acids which make up the portions of cells which determine physical characteristics of living organisms. According to presently accepted theory, the chromosomes found in the nucleus of cells contain within them genes which determine the physical characteristics of all living organisms. The genes are composed of long chain molecules of nucleic acid which comprise two major types, deoxyribonucleic acid (DNA) and ribonucleic acid (RNA). DNA is found primarily within the chromosomes whereas most of the RNA is located outside the nucleus in the cytoplasm.

The accepted structure of the DNA molecule is that proposed by Watson and Crick. According to the Watson-Crick model, DNA is comprised of two intertwining strands forming an interlocking double helix orientated about a common central axis. The strands are composed of alternating units of a sugar (deoxyribose) and a phosphate linked together by chemical bases attached to the sugar units. The bases are made up of the nitrogen-containing compounds purine and pyrimidine—the purines being adenine and guanine and the pyrimidines being cytosine and thymine. A molecular group consisting of a sugar unit having a phosphate unit attached to one side and a purine or pyrimidine compound to the other side is called a nucleotide.

While there are four bases in the DNA molecule, it can be shown that only purine-pyrimidine bonds are possible and that purine-purine or pyrimidine-pyrimidine bonds are theoretically impossible. In fact, it has been found an adenine is always joined to a thymine by a hydrogen bond and similarly, a guanine is always connected to a cytosine by a hydrogen bond. Thus, the two halves of the DNA molecule are complimentary-where a nucleotide in one half contains adenine the other half will have thymine and where the first half contains guanine the other half will have cytosine. It is the order in which these pairs of bases are arranged in the DNA molecule that determines the genetic code.

When a cell divides, the DNA molecules making up the chromosomes replicate themselves by a process in which each half acts as a model for the new molecule. During division, the double helix splits at the purine-pyrimidine hydrogen bonds and free nucleotides (which are always present in the cell) join each half. The free nucleotides couple to the nucleotides in the splitting DNA molecule in such a way that only adenine-thymine and guanine-cytosine bonds are formed. In addition, the sugar and phosphate units of the free nucleotides are joined together by covalent bonds once they have been positioned along the DNA chain, this reaction being catalyzed by an enzyme. As a result, two new DNA molecules are formed which are identical with the original molecule.

As previously mentioned, ribonucleic acid (RNA) also exists within the cell. RNA is quite similar to DNA except that the sugar deoxyribose is replaced by the sugar ribose and the base thymine is replaced by another pyrimidine, uracil. One form of RNA, termed "messenger-RNA", is formed within the nucleus by a replication process similar to that which the DNA molecule is caused to split. The nucleotides in the messenger-RNA correspond to those in the DNA except for the substitution of uracil for thymine and the additional atom of oxygen in the sugar. The resultant messenger-RNA molecule, therefore, carries the same genetic code as the gene that formed it.

After it is formed, the messenger-RNA molecule breaks out of the nucleus and moves into the cytoplasm where it attaches itself to a ribosome. A ribosome is a particle found in the cytoplasm which is made up of about half RNA and half protein. The messenger-RNA is now in a position to direct the synthesis of protein by joining a number amino acids to form a polypeptide chain. This is accomplished with the aid of another form of RNA, referred to as "transfer-RNA", which is small enough to be readily soluble in the cell fluid. There are a number of variations of transfer-RNA and each has the property that it will attach itself to a specific amino acid. In addition, each form of transfer-RNA has three bases from the group adenine, uracil, guanine and cytosine. The particular three bases comprising each transfer-RNA molecule corresponds to the specific amino acid with which a transfer-RNA molecule is associated.

After attaching to an amino acid, each transfer-RNA molecule migrates to a location on the messenger-RNA molecule having a base sequence corresponding to the compliment of the triplet code on the transfer-RNA. When all the transfer-RNA molecules are in place along the polynucleotide chain of the messenger-RNA, the amino acids are in the correct order for enzymatic processes to bring about a reaction that combines them into a specific polypeptide chain corresponding to the desired protein.

From this brief summary, it can be seen that the molecular configurations of the nucleic acids and the processes involved in the formation of protein are not only quite complex, but are three dimensional in nature.

2. Brief Description of the Prior Art

When the structure of DNA and RNA was first announced, it was illustrated for classroom purposes only by lecture and two dimensional drawings.

Very complex models of DNA and RNA have been constructed using individual pieces simulating the various atoms which make up the molecule. A model of this type is extremely complex, difficult to assemble, and very expensive.

Klotz U.S. Pat. No. 3,296,714 discloses a model for nucleic acids such as DNA and RNA in which the individual nucleotides are illustrated by thin tubular members which are assembled in a ladder-shaped structure and then twisted into helical form. This model has the disadvantage that the bases of each of the nucleotides do not have a shape corresponding to the known structure of the nucleotides and the model is not self-supporting and does not illustrate adequately the different bases forming the several nucleotides making up the DNA or RNA molecules.

Baker U.S. Pat. No. 3,594,924 discloses a model for DNA or RNA in which the sugar, phosphate, and bases are illustrated by beads of varying shape which are connected end to end or side to side, in the case of the bases, and twisted into a helical form and supported on a supporting rod. This model is complex to assemble and has the disadvantage that the individual beads do not approximate the proportions and shape of the components of the DNA or RNA helixes.

SUMMARY OF THE INVENTION

This invention comprises an improved molecular model for illustrating the structure of nucleic acids such as DNA and RNA. The model consists of a plurality of helical segments proportioned in helical length and helical curvature to the shape of the sugarphosphate backbone unit and having planar units integral therewith and projecting from about the mid-point thereof and having a shape corresponding to the bases in each of the several nucleotides which make up the DNA or RNA molecule. The bases are provided with suitable means in the form of prongs or sockets which permit the nucleotides to be assembled in pairs in the case of DNA structure. The helical segments are provided with suitable means for connection in end to end relation in the form of a single helix in the case of RNA or a double helix in the case of DNA having a configuration illustrating the shape and proportions of the DNA or RNA and the components thereof. The individual helical segments and planar base units attached thereto are preferably of a predetermined color which is different for each of the separate nucleotides making up the DNA or RNA molecule.

BRIEF DESCRIPTION OF THE DRAWINGS

FIG. 1 is a view in elevation of a model of a DNA molecule.

FIG. 2 is a top or end view of the model of the DNA molecule shown in FIG. 1.

FIG. 3 is an isometric view, partially exploded, showing one of the pieces being a model of a nucleotide having a cytosine side group and illustrating its connection to the guanine group on the opposite nucleotide.

FIG. 4 is a view in elevation of one of the pieces of the model representing the nucleotide having a cytosine side group.

FIG. 5 is a view in elevation of another piece of the model having a thymine or uracil side group.

FIG. 6 is a view in elevation of another piece of the model having a guanine side group.

FIG. 7 is still another of the model having an adenine side group.

DESCRIPTION OF THE PREFERRED EMBODIMENTS

In accordance with this invention, there is provided a kit containing a plurality of pieces which are the components required for assembly of models of nucleic acid molecules. The individual pieces are helical in shape and are proportioned to the helical curvature and length of the individual nucleotides and have planar units formed integral therewith which model in size and shape the purine and pyrimidine base components. The individual pieces are preferably of a molded plastic which will retain the helical form of the DNA or RNA molecule when assembled. The individual pieces are preferably provided with a male connector at one end and have a female receptor at the other end. The purine and pyrimidine side groups are similarly provided with projections which provide for a male-female connection, each of which illustrates the hydrogen bonds joining the side bases together. The individual units are preferably made in a distinctive color or surface texture providing a ready identification for the individual nucleotides. Thus, the color code used may be any suitable variety of colors, e.g. adenine-red, cytosine-yellow, thymine-blue, guanine-green, and uracil-violet.

The individual pieces are accurately proportioned according to the known dimensions of the individual nucleotides and the helixes formed of the polynucleotide chains. A more complete description of the individual pieces and their proportions will be set forth in the description making reference to the individual drawings.

Referring now to the drawings, and more particularly to FIG. 1, there is shown a model of DNA molecule assembled from the components of the kit. The model is shown assembled in the form of a double helix corresponding to the actual configuration of the DNA molecule. In the DNA molecular model shown in FIG. 1, there are two separate helixes 10 and 11 which are wound around a common axis, each being a right-hand helix. The helixes 10 and 11 are slightly asymmetric with the result that the two helixes define a minor helical groove c and a major helical groove d in the surface of the DNA molecule. Each of the helixes 10 and 11 is formed of a plurality of helical segments 12 having a planar side group 13 representing the purine or pyrimidine side group in the individual nucleotides which make up the helical molecule. The view shown in FIG. 2 illustrates more clearly the connection between the amino acid side groups 13 which, in this view, are the side groups cytosine and guanine.

In FIG. 4 to 7, the individual nucleotide segments are shown substantially enlarged in relation to FIGS. 1 and 2. In FIG. 3 there is shown an exploded view which illustrates more clearly the connection of the planar side units which represent the bases by which the helixes are bound together.

The individual components of the model are preferably made of molded plastic as one piece units. The units have a helical curvature and length porportioned according to the published information available on the structure of the DNA molecule. The actual molecular length of a full coil of one of the helixes, which is shown in FIG. 1 as the dimension a is 3.4 nm. The diameter of the helix as indicated by dimension b in FIG. 1 is 2.0 n.m. There are 10 nucleotides in a single turn of one of the helixes making up the DNA molecule. The length of an individual nucleotide is 0.34 nm. The model is proportioned according to these dimensions.

In FIG. 4, there is shown a model of one of the nucleotide units consisting of a backbone in the form of a helical segment 12a and having a pyrimidine side group 13a formed integrally therewith, preferably of a molded plastic material. The backbone segment 12a represents the sugar-phosphate unit making up the helical backbone of the DNA molecule. In the case of DNA the sugar backbone is deoxyribose phosphate. In the case of the RNA model the backbone is ribose phosphate. The helical segment 12a representing the sugar-phosphate backbone unit is provided with a male prong 13a at one end and female receptor 15a at the other end. In this unit, the side chain 13a illustrates the pyrimidine-cytosine which is shown to be hexagonal in shape and is in the form of a thin planar unit, as is seen in the isometric view shown in FIG. 3. The unit 13a is provided with 3 prongs 16a, 17a and 18a which are hollow tubular members representing the hydrogen bonds in the cytosine-guanine pairing in the DNA molecule.

In FIG. 5, the unit shown in a helical segment illustrating a sugar-phosphate unit having a side group which is pyrimidine, thymine or uracil. In this portion of the molecular model the sugar phosphate backbone is illustrated by helical segment 12b having male prong 14b at one end and female receptor 15b at the other end. Side group 13b illustrates the pyrimidine, thymine or uracil and is in the form of a regular hexagon which is formed as a thin planar unit proportioned somewhat as is shown in FIG. 3. This side unit 13b is provided with prongs 19b and 20b which are hollow tubes functioning as female receptors and illustrating the hydrogen bonding of thymine or uracil to adenine.

In FIG. 6, the unit shown consists of helical segment 12c having a male prong 14c at one end and female receptor 15c at the other end which illustrates the sugar-phosphate backbone. Unit 13c which is formed integrally with backbone unit 12c is a planar unit illustrating the shape of the side group which is the purine-guanine. In this piece of the molecular model the side group 13c which illustrates the guanine group is provided with 3 prongs 16c, 17c and 18c which are male prongs adapted to fit the female prongs 16a, 17a and 18a on the unit shown in FIG. 4. This connection is also illustrated isometric view shown in FIG. 3.

In FIG. 7, the piece of the molecular model shown comprises helical segment 12d having male prong 14d and female receptor 15d and which illustrates the sugar-phosphate backbone portion of the nucleotide. The side group 13d is a planar unit shaped to represent the purine-adenine. This side group 13d has 2 prongs 19d and 2 d which are male prongs adapted to cooperate with female prongs 19b and 20b on the thymine or uracil side group illustrated in the embodiment shown in FIG. 5.

The pieces making up the model are preferably proportioned as accurately as possible to the dimensions, spacing, shape, etc. of the components of the DNA or RNA molecules as is given in the literature. The backbone pieces representing the sugar-phosphate components of the individual nucleotides can be assembled in any order with the male prong of one fitting the female receptor of the other. When assembled in this manner, a model of the backbone is formed which is a helix proportioned according to the proportions of the molecular helix given in the literature. There are 10 of the backbone units assembled to make one complete turn of the helix, which corresponds to the arrangement of the backbone units in the DNA or RNA molecule. These units are proportioned to have a helical curvature such that each is an arcuate helical piece having 36° of arc and a transverse helical dimension which is one-tenth the distance, longitudinally, of one complete turn of the helix. The diameter of the helix and the length of a complete turn are preferably proportioned as closely as possible to the proportions for the dimensions a and b given above. While the individual backbone pieces 12a, 12b, 12c and 12d can be assembled in any order, the planar units 13a, 13b, 13c and 13d which represent the side groups are limited as to their interconnection. Thus, uracil or thymine can be connected to adenine to illustrate the hydrogen bond of those two groups and cytosine can be connected to guanine to illustrate the hydrogen bonding of those groups. The lengths of the cooperating male and female prongs which establish the connection between the planar side groups are proportioned to the atom spacing in the molecule which represents the hydrogen bonds between the side groups in the individual nucleotides. It is thus seen that, while one of the helical strands of the DNA molecule can be assembled with the various nucleotide backbone segments in any desired order, the order fixed for one of the helical strands dictates the order of the nucleotides in the other strand of the double helix. The size of the individual side groups and their respective angular orientation on the helical segments representing the sugar-phosphate backbone unit and the length of the prongs which connect pairs of amino acid groups together to illustrate the hydrogen bonding determine the spacing of the individual helixes relative to each other and establish the asymetric relationship of the individual helixes which produces a minor groove c and a major groove d in the surface of the molecule (and the molecular model) as illustrated in FIG. 1.

The various pieces shown in FIGS. 4 to 7, when assembled produce the double helix shown in FIG. 1 which is a model of the DNA molecule. The individual helical segments and planar side groups which illustrate the individual nucleotides are preferably color coded as described above so that a different color identifies each of the separate groups. This model can be assembled and disassembled and the parts rearranged to illustrate the replication of the DNA molecule in the biochemical processes of cell formation and multiplication.

The RNA molecule is a single helix which is identical to one of the individual helixes of the DNA molecule with minor structural changes. In RNA the backbone unit in the nucleotide is ribose-phosphate instead of deoxyribose-phosphate. This does not involve any change in the individual pieces of the model. The side groups are the same as in the DNA except that uracil is substituted for thymine. The model can therefore be assembled as a single helix to illustrate the RNA molecule for educational or informational purposes.

The RNA model can be used to illustrate the functions of messenger-RNA and transfer-RNA in biochemical processes.

According to present theory, each amino acid is associated with one or more three letter codes formed by the bases adenine uracil, guanine and cytosine. These bases arranged in a code will cause a specific amino acid to attach itself to the transfer-RNA, and therefore, in the model, these bases fit together in the same way that this process takes place biochemically. Transfer-RNA assemblies may be constructed to illustrate the duplication of any desired structure.

The following table illustrates the genetic code for each of the amino acids indicated therein. In this table, adenine is represented by the letter A, uracil by U, guanine by G, and cytosine by C. Transfer-RNA molecules containing these code words may be simulated by assembly of the backbone segments in the manner indicated.

TABLE I

| Amino Acid | RNA Code Words | Component Backbone Segments |
| --- | --- | --- |
| Alanine | CCG | 12a, 12a, 12c |
| Arginine | CGC | 12a, 12c, 12a |
| Asparagine | ACA | 12d, 12a, 12d |
| Aspartic Acid | GUA | 12c, 12b, 12d |
| Cystine | UUG | 12b, 12b, 12c |
| Glutamic Acid | GAA | 12c, 12d, 12d |
| Glutamine | ACA | 12d, 12a, 12d |
| Glycine | UGG | 12b, 12c, 12c |
| Histidine | ACC | 12d, 12a, 12a |
| Isoleucine | UAU | 12b, 12d, 12b |
| Leucine | UUG | 12b, 12b, 12c |
| Lysine | AAA | 12d, 12d, 12d |
| Methionine | UGA | 12b, 12c, 12d |
| Phenylalanine | UUU | 12b, 12b, 12b |
| Proline | CCC | 12a, 12a, 12a |
| Serine | UCU | 12b, 12a, 12b |

TABLE I-continued

| Amino Acid | RNA Code Words | Component Backbone Segments |
| --- | --- | --- |
| Threonine | CAC | 12a, 12d, 12a |
| Tryptophan | GGU | 12c, 12c, 12b |
| Tyrosine | AUU | 12d, 12b, 12b |
| Valine | UGU | 12b, 12c, 12b |

After the amino acids have attached themselves to the corresponding transfer-RNA molecules, the transfer-RNA molecules together with the associated amino acid, converge on the messenger-RNA molecule and attached themselves in an order determined by the transfer and messenger RNA base elements. The transfer-RNA assemblies can be connected to the messenger-RNA only in one way and therefore the amino acid blocks are arranged in the specific order required to simulate the polypeptide length spelled out by the genetic code in the messenger-RNA.

From the above description, it is seen that there is disclosed an improved molecular model for illustrating the DNA and RNA molecules. The individual pieces are helical segments with planar side groups formed integrally thereon proprotioned to illustrate the purine and pyrimidine side groups. The backbone portion of the segments illustrating the individual nucleotides are preferably of a solid rod-like molded plastic material having the desired helical configuration. It should be noted, however, that these pieces could be hollow and made of tubular material provided that they have the desired shape. The backbone pieces and the planar base side units are illustrated as being connected by male-female connectors. The relative positioning of the male-female connectors could obviously be reversed without changing the desired result. It should also be noted that the means for connecting the various pieces together could be varied so long as the desired proportions are maintained. Thus, the pieces could have the male-female connectors eliminated and be made of material which is magnetic or carrying magnets in the end portions to provide for an end to end connection of the backbone pieces and a side to side connection of the planar base units. Likewise, the planar base units could be made separate from the backbone pieces and sesecured by appropriate securing means. The particular materials of construction which may be used for the individual pieces of the molecular model can be of any suitable material. For purposes of economics of construction, it is preferred that the pieces be injection molded of a suitable thermoplastic. They could also be molded of thermosetting resins or could be made of metal or wood, but at a much higher cost. The particular structure shown in the drawings and described above is generally the preferred structure for this molecular model since the model, when assembled, is a self supporting structure (even though a support may be used for display purposes). The particular form shown and described above for the model is also preferred inasmuch as it approximates most closely the actual structure of the DNA or RNA molecule. The particular structure of the individual nucleotides and their base side groups and the manner of connection produces an assembled model in which the individual helixes have a configuration and spcing more nearly that of the actual DNA or RNA molecule and the side groups illustrate the position and mode of attachment of those groups both to the backbone of the molecule and the hydrogen bonding to the adjacent groups.

I claim:

1. A model of a nucleic acid molecule comprising
 (a) two rigid self-supporting helical strands composed of
  (i) a plurality of helical segments fitted together in end to end relation as two right hand helices, in which each segment is preformed in a rigid helical curvature and length proportioned to the sugar-phosphate backbone of an individual nucleotide, and
  (ii) means securing said segments together, and
 (b) a plurality of members proportioned to the shape and dimensions of the purine-pyrimidine units of said nucleic acid molecule and secured rigidly one on each of said helical segments, and having securing means connected to like members on adjacent units to support said helical strands in accurate asymmetrical relation.

2. A molecular model according to claim 1 in which said helical segments each have a male prong at one end and a female receptor at the other end, and said male prong fitting in an adjacent female receptor constituting said segment securing means.

3. A molecular model according to claim 1 in which ten of said helical segments secured end to end form one complete turn of said helix.

4. A molecular model according to claim 1 in which said securing means on said purine-pyrimidine unit members comprises a plurality of male and female connectors.

5. A molecular model according to claim 1 in which said last named members are planar in configuration and have an external shape corresponding to one member of the group consisting of uracil, thymine, cytosine, guanine, and adenine.

6. A molecular model according to claim 5 in which said last named members each have prongs adapted to connect one member to another, and said prongs when connected having a length proportioned to the length of the hydrogen bonds in the nucleic acid molecule.

* * * * *